J. R. AYERS.
PEANUT PLANTER.
APPLICATION FILED JUNE 16, 1915.
1,161,369.
Patented Nov. 23, 1915.
2 SHEETS—SHEET 1.
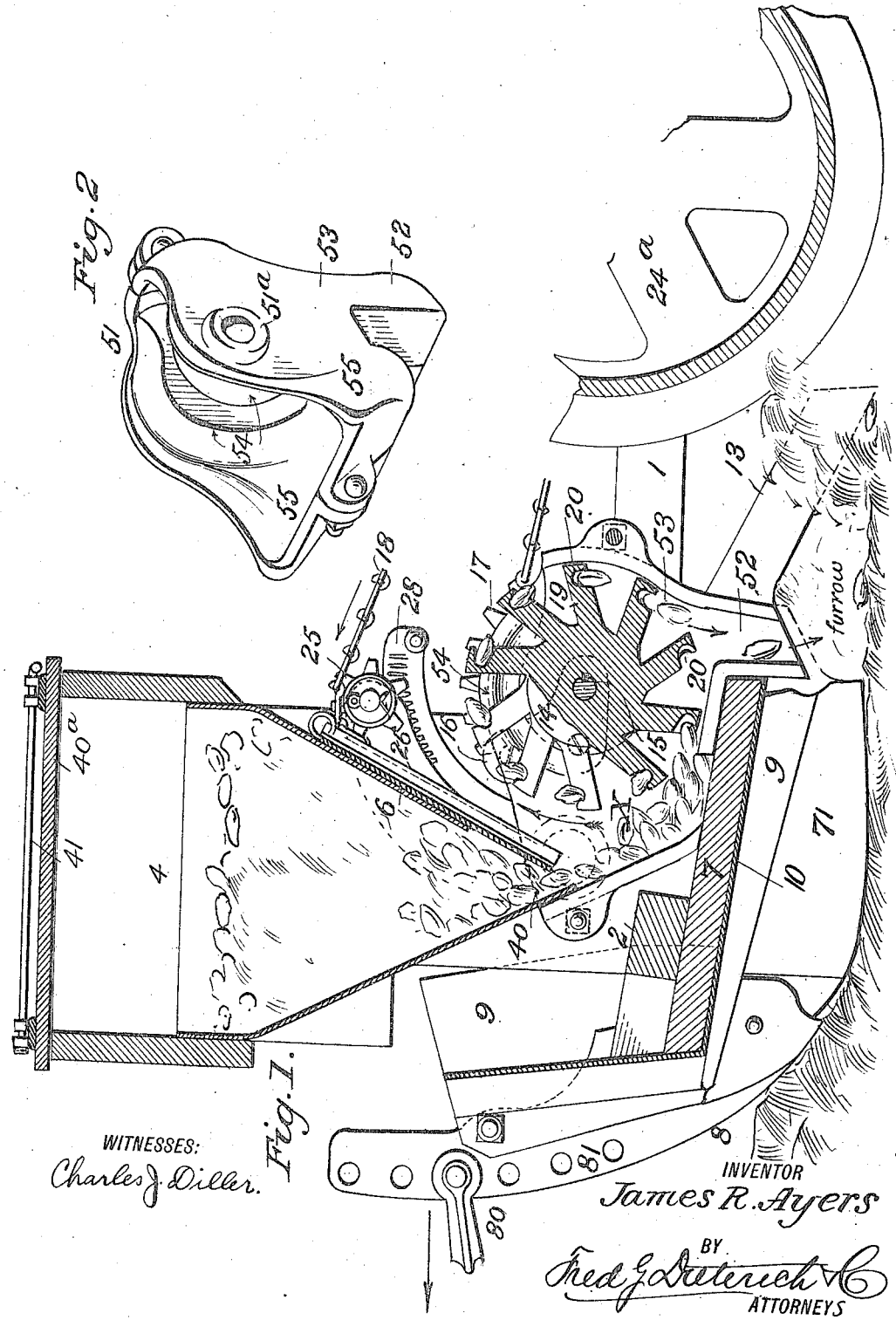
WITNESSES:
Charles J. Diller.
INVENTOR
James R. Ayers
BY
Fred G. Dieterich
ATTORNEYS

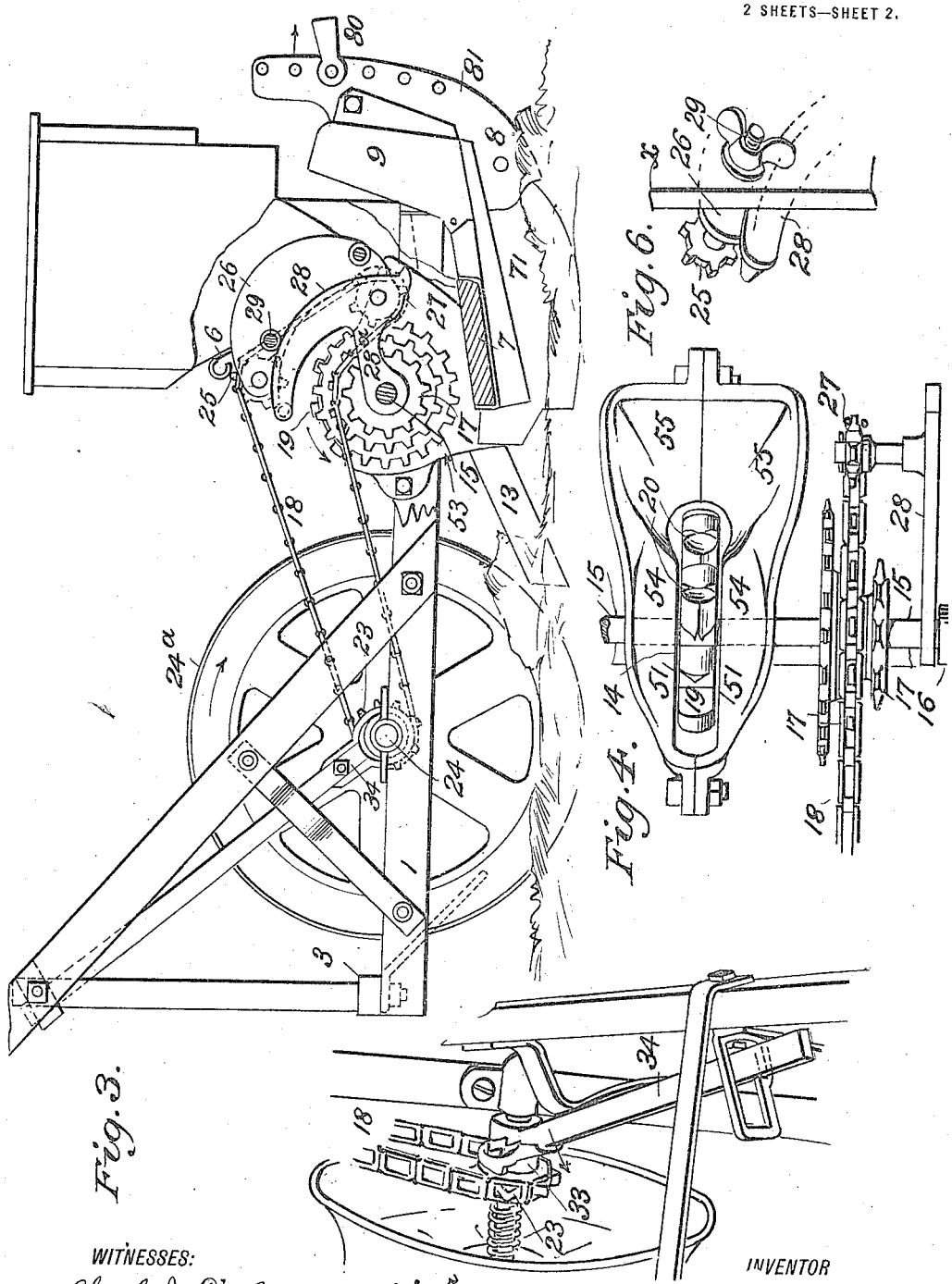

UNITED STATES PATENT OFFICE.

JAMES R. AYERS, OF PETERSBURG, VIRGINIA.

PEANUT-PLANTER.

1,161,369.

Specification of Letters Patent.

Patented Nov. 23, 1915.

Application filed June 16, 1915. Serial No. 34,468.

*To all whom it may concern:*

Be it known that I, JAMES R. AYERS, residing at Petersburg, in the county of Dinwiddie and State of Virginia, have invented a new and Improved Peanut-Planter, of which the following is a specification.

The present invention has for its purpose to provide an improved peanut planter that embodies peculiarly designed seed carrying means that operate to lift the peanuts through a sub-hopper coöperating with a main or feed hopper and that operates to drop the seeds, for being directed into the furrow, in a uniform and properly spaced manner.

Another object of my present invention is to provide a peanut planting machine in which the seed carrying means includes a rotary carrier having peripheral pick-up members and rotatable within a sub-hopper having a special throatway or seed passage construction through which the seeds lifted by the carrier, are conveyed as they are carried to the dropping position and which includes cheek or side pieces that are relatively restricted at the point where the seeds are lifted to drop into the discharging chute and nozzle to retard the passage of the surplus seeds and to cause them to separate from the ones in direct engagement with the pickups or cup members, and to pass back into the reservoir end of the said supplemental hopper.

Again, my invention embodies, in a peanut planter in which is included a rotary seed pick-up and carrier means of the general form stated, a special form of hopper, supplemental with respect to the main hopper, and with which it is coöperatively connected, that comprises two like shaped metallic sections, each of which includes a cheek member, guideways over which the surplus peanuts, as they are lifted, are caused to travel, chute portions that terminate in discharging nozzles for leading the seeds into the furrow for receiving them, a reservoir portion into which the retarded or surplus seeds are caused to fall back during the operation of conveying the seed to the planting point, the said cheek members, the guideway, the chute and nozzle and the reservoir portion of each of the said metal sections being integrants.

With other objects in view that will hereinafter appear my present invention embodies, in a peanut planting machine, the peculiar construction, and the novel arrangement of the parts hereinafter fully explained, specifically pointed out in the appended claims and illustrated in the accompanying drawings in which:

Figure 1 is a vertical longitudinal section of my improved peanut planter. Fig. 2 is a perspective view of the "sub-hopper" hereinafter specifically referred to. Fig. 3 is a side elevation of my improved peanut planter, parts being broken away to the more clearly illustrate the dropper shaft speed gears and the chain take-up devices. Fig. 4 is a top plan view of the "sub-hopper" and the seed pick-up, and planting devices. Fig. 5 is a detail view of the clutch mechanism and shifter therefor hereinafter described. Fig. 6 is a detail perspective view of parts of the chain slack take-up devices hereinafter referred to.

In my present construction of peanut planter the main frame essentially comprises the side beams 1 connected at the front end with the draft iron 81, and at the rear by the cross bar 3.

4 designates a main hopper of the usual form mounted on the forward end of the main frame whose lower contracted end is of sheet metal and has a restricted discharging opening 40, controlled by a slide gate 6 of the ordinary type.

7 designates a bottom member that extends transversely under the front end of the main frame and under which extends the soil opener 8, whose front or soil penetrating end projects upwardly in front of the hopper 4 and forms a draft member 81 with which the clevis 80 connects in the usual manner.

9—9 are dirt guards at the front of the machine and 10—10 are brace members that join with the floor or bottom member 7 and the draft member 81, as shown.

71 designates the furrow opener and it hingedly connects with the opener 8 and extends back and embraces the dropping nozzle of the supplemental hopper presently again referred to and as clearly shown in Fig. 3 of the drawing.

The main hopper includes hinged cover members 40 joined with a common hinge rod 41.

The parts so far described, *per se*, form no part of my present invention, the essential feature of which comprises the combining of a special form of sub-hopper with the main hopper and a rotary seed carrier or conveying mechanism, the general arrangement of which and the coöperative connection thereof with the main hopper is best shown in Fig. 2.

The sub-hopper, before referred to, and which is shown in detail in Fig. 2, consists of two half sections of like construction each of which includes a side or cheek portion 51 having an aperture 51$^a$, rearwardly and downwardly extending semi-cup shaped portions 55 whose bottoms extend forwardly and merge with pendent nozzle-like members 52 formed on the lower ends of the chute 53 on the front end of the said cheek members, see Fig. 2. Each cheek member also includes an inwardly inclined flange 54 concentric with the apertures 51$^a$ that begins in the lower end of the cup portions 55 and terminates at the upper end of the chutes 53. By reason of forming the two members that constitute the sub-hopper, in the manner shown and described, the said cheek pieces, the cup shaped ends, the chute-like portions and the guide flanges, are all shaped up of a single metal body, and as the two members are held clamped together as one, all of the different parts that constitute the complete hopper, as it were, are substantially integral parts.

The sub-hopper in its operative position, as shown in Fig. 1, has its bottom resting on the bottom board 7, and the cup shaped end lapped over or in telescopic connection with the lower or discharging end of the main hopper, from which the seed drops into the reservoir X formed in the lower or cup-shaped part of the said sub-hopper the nozzle or discharging end of the said sub-hopper extending down between the furrow opener and in position to so drop the seeds into the furrow that they are readily covered by the coverer blades 13 that follow behind the nozzle, as shown.

The seed dropping, conveying and delivering means in my present construction comprises a disk 14 that is rotatably mounted between the cheek members of the sub-hopper on a cross axle 15 that takes through the apertures 51$^a$ in the said cheeks 51, and is mounted in bearing irons 16—16 in the framing of the machine and which slidably carries a series of differential drive gears 17, to either of which the drive chain 18, presently again referred to may be applied for effecting the desired speed rotation of the said disk 14.

Disk 14 has a series of pick-up fingers 19, each provided with a seed receiving pocket 20 on the pick-up side, and the said fingers are relatively of such length that their outer ends pass closely to the bottom of the reservoir X, as the disk travels forward, (see arrow) to effect the desired sweep of the said fingers through the seed contained in the said reservoir and fed thereto from the main hopper.

By referring now to Fig. 1, it will be seen that the seed pick-up and conveyer fingers 70 are of such length and their pockets relatively such, with respect to the flanges 54, on the opposite sides of the sub-hopper, that the seeds, other than those held in the pockets of the fingers and which are carried up by the said fingers in the said up movement roll laterally from between the fingers and onto the said flanges 54, which serve as conduits or ways for directing the split seeds back and down into the reservoir, it being apparent, by reason of the construction stated, the rotary carrier fingers will be practically freed of all the surplus seeds as they start in their forward or discharging direction (see arrow $y$) and by reason thereof, the seeds are fed singly and uniformly into the chuteway of the sub-nozzle and from whence they pass through the nozzle into the furrow.

Power is applied to the seed pick-up and delivery disk by the chain 18, which takes over a chain gear 23 on the shaft 24 that carries the ground covering wheel 24$^a$, and to provide for readily taking up the slack in the said chain when shifting it from one of the drive gears on the disk axle to another, a guide gear 25 is mounted on a bracket 26 on the hopper framing over which the chain 18 takes and from which it passes to an idler gear 27 mounted on the forward end of a curved arm 28, integral with an arm 28$^a$ swingably mounted on the axle 15, it being understood that the position of the gear 27 is readily shifted by moving the arm 28 to the desired position for taking up the chain slack, a clamp bolt 29 on the bracket that carries the guide gear, and which passes through the side piece $x$ of the hopper frame and receives a winged nut serving to hold the arm 28 to its adjusted positions. For throwing the drive chain out of gear, a clutch connection 33, controlled by a throw lever 34, is provided, see Fig. 5.

It will be noticed from Fig. 1 that the reservoir of the sub-hopper into which the seeds are fed from the main hopper is a relatively small one, and the gate that controls the seed outlet from the main hopper is adjusted for feeding the seeds practically singly to the said reservoir. The reason for providing a supplemental seed hopper or reservoir for coöperating directly with the seed pick-up and dropping means is to present only a small quantity of the seeds to be engaged by the lifting fingers or in other words, to keep the said fingers from lifting up such an excessive quantity of the seeds that might tend to interfere with the single dropping and proper spacing of the seed.

From the foregoing taken in connection with the drawings, the complete construction, the manner of operation and the advantages of my invention will be readily apparent, and while in practice I prefer the specific construction and arrangement of the parts as shown and described, it is obvious that the said detailed construction of parts may be modified or varied as to form and proportion without departing from my invention as set out in the appended claims.

What I claim is:

1. A planter comprising a frame, a main hopper mounted upon the said frame, a sub-hopper that includes a reservoir in communication with the main hopper, a rotary seed pick-up and dropping member mounted in the said sub-hopper, an axle that takes through the said member and the sides of the sub-hopper, said hopper having a discharging chute or nozzle adapted for extending down into the ground furrow, into which the rotary member discharges the lifted seeds and means that form a part of the hopper sides for retarding some of the seeds carried up from the hopper reservoir and directing them back into the said reservoir.

2. In a peanut planting machine of the character described, a seed pick-up and dropping means that comprises a hopper formed of two half sections of like contour, each including an apertured cheek or side portion, a forwardly projected semi-cup shaped extension, and a rearwardly extended chute portion having a nozzle-like discharging end integral with the cheek piece, means for clamping the two sections together, a rotary seed pick-up and discharging member held within the hopper, an axle that takes through the apertures in the cheek pieces and on which the rotary member is mounted, means for imparting movement to the said shaft and member, the said rotary member including radially projected pick-up fingers having seed pockets in their delivery sides, and means on the inside of the cheek pieces that coöperate with the fingers and adapted for receiving the seeds that drop laterally from between the picker fingers as they travel toward the seed dropping position and conveying them back into the reservoir end of the said sub-hopper.

3. A planter of the character stated comprising a frame, a main hopper and a sub-hopper, the latter being formed of two half sections of like contour and means for clamping the two sections against each other, each of the sections including an apertured cheek or side portion, forwardly extended semi-cup portions, rearwardly extended chute-like portions terminating in nozzle-like ends, said cup, chute and nozzle portions being integral with the cheek portions, the said cheek portions having inwardly projected flanges concentric with their apertures, a seed pick-up and dropping disk mounted between the cheek pieces, an axle that takes through the apertures in the cheek pieces and the dropping disk, the latter including radial fingers each having a seed pocket in the delivery side and that coöperates with the projected flanges and means for imparting motion to the said rotary disk.

4. In a machine of the character stated, the combination with the frame, a main hopper mounted on the frame and the furrow opener; of a sub-hopper mounted below and at the rear of the main hopper, said sub-hopper consisting of two half section plates each of which includes an apertured central or cheek piece, a forwardly projected semi-cup shaped portion that extends over the discharging end of the main hopper, said cup-shaped portion extending beyond the aperture in the cheek piece, a rearwardly extended semi-chute portion, the lower end of which terminates in a nozzle that extends down into the rear end of the furrow opener, the said cheek portion, the cup-like portion and the chute being integrally joined, an axle that takes through the said cheek pieces, a seed pick-up and dropping disk mounted in the axle between the cheek pieces, said disk having radial fingers, each provided with a seed pocket in its discharging face, said cheek pieces including inwardly projected flanges concentric with the axle aperture and extending from the upper end of the chute portion hopper down into the cup-shaped portion, and means operable from a driving part of the machine for imparting movement to the rotary seed pick-up and dropping disk.

JAMES R. AYERS.